(12) United States Patent
Bakshi et al.

(10) Patent No.: US 9,609,230 B1
(45) Date of Patent: Mar. 28, 2017

(54) USING A DISPLAY AS A LIGHT SOURCE

(71) Applicant: Google Inc., Mountain View, CA (US)

(72) Inventors: Dhruv Bakshi, Zurich (CH); Jakob Nicolaus Foerster, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/983,697

(22) Filed: Dec. 30, 2015

(51) Int. Cl.
| | |
|---|---|
| H04N 5/225 | (2006.01) |
| H04N 5/235 | (2006.01) |
| H04N 7/14 | (2006.01) |
| H04N 5/232 | (2006.01) |

(52) U.S. Cl.
CPC ....... *H04N 5/2354* (2013.01); *H04N 5/23216* (2013.01); *H04N 5/23293* (2013.01); *H04N 7/141* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,697,953 B1 * | 2/2004 | Collins | ................ | G06F 1/3203 713/320 |
| 7,158,099 B1 * | 1/2007 | Berube | ................ | G03B 15/03 345/9 |
| 7,552,349 B2 * | 6/2009 | Hassan | ................ | G06F 1/3203 345/210 |
| 8,576,325 B2 * | 11/2013 | Dudek | ................ | H04N 7/144 345/632 |
| 8,797,441 B2 * | 8/2014 | Patel | ................ | H04N 5/20 348/333.01 |
| 9,131,150 B1 * | 9/2015 | Mangiat | ................ | H04N 5/2352 |
| 9,183,813 B2 * | 11/2015 | Chirde | ................ | G09G 5/30 |
| 2007/0115349 A1 * | 5/2007 | Currivan | ................ | H04N 7/141 348/14.08 |
| 2007/0250896 A1 * | 10/2007 | Parker | ................ | H04N 5/45 725/135 |

(Continued)

OTHER PUBLICATIONS

Americos Technologies PVT. LTD., "Selfshot—Front Flash Camera," Android Apps on Google Play, updated Oct. 13, 2015 [retrieved on Nov. 3, 2015]. Retrieved from the Internet: URL<https://play.google.com/store/apps/details?id=com.americos.selfshot&hl=en>, 4 pages.

(Continued)

*Primary Examiner* — Duc Nguyen
*Assistant Examiner* — Assad Mohammed
(74) *Attorney, Agent, or Firm* — Fish & Richardson P.C.

(57) ABSTRACT

In general, the subject matter can be embodied in methods, systems, and program products for using a display of a computing device as a light source. The computing device receives a first image that was captured by a camera of the computing device, determines a brightness of at least part of the first image, selects an intensity of a light source that is to be presented by the display of the computing device, the intensity of the light source being selected based on the determined brightness of the at least part of the image, presents the light source by the display of the computing device, the presented light source having the selected intensity, and receives a second image that is captured by the camera of the computing device while the computing device is presenting the light source on the display using the selected intensity.

24 Claims, 6 Drawing Sheets

(56) References Cited

U.S. PATENT DOCUMENTS

| | | | | |
|---|---|---|---|---|
| 2008/0055228 A1* | 3/2008 | Glen | ............... | G09G 3/3406 345/102 |
| 2011/0109644 A1* | 5/2011 | Geutskens | ............... | G06F 3/017 345/589 |
| 2015/0229837 A1* | 8/2015 | Her | ............... | H04N 5/23219 348/222.1 |
| 2015/0248167 A1* | 9/2015 | Turbell | ............... | G06F 3/017 715/754 |
| 2015/0271444 A1* | 9/2015 | Defazio | ............... | H04N 7/141 348/14.07 |

OTHER PUBLICATIONS

JailBird Interactive, "illuMEnate: Front Camera Flash," Android Apps on Google Play, updated Dec. 28, 2014 [retrieved on Nov. 3, 2015]. Retrieved from the Internet: URL<https://play.google.com/store/apps/details?id=com.JailBird.illuMEnatefree&hl=en>, 4 pages.

* cited by examiner

USING A DISPLAY AS A LIGHT SOURCE

TECHNICAL FIELD

This document generally relates to using a display as a light source.

BACKGROUND

Computing systems can be used to support various communication platforms. For example, desktop or mobile computing devices including cameras, displays, microphones, and speakers can execute video chat applications which facilitate conversations between multiple users in real time. During a video chat conversation, for example, audiovisual content captured by multiple different computing devices can be exchanged over a communications network.

SUMMARY

This document describes techniques, methods, systems, and other mechanisms for using a display as a light source.

As additional description to the embodiments described below, the present disclosure describes the following embodiments.

Embodiment 1 is a computer-implemented method. The method comprises receiving, by a computing device, a first image that was captured by a camera of the computing device. The method comprises determining, by the computing device, a brightness of at least part of the first image. The method comprises selecting, by the computing device, an intensity of a light source that is to be presented by a display of the computing device, the intensity of the light source being selected by the computing device based on the determined brightness of the at least part of the image. The method comprises presenting, by the computing device, the light source by the display of the computing device, the presented light source having the selected intensity. The method comprises receiving, by the computing device a second image that is captured by the camera of the computing device while the computing device is presenting the light source on the display using the selected intensity.

Embodiment 2 is the method of embodiment 1, wherein the light source that is presented by the display occupies a portion of the display and does not occupy all of the display.

Embodiment 3 is the method of embodiment 1 or 2, wherein presenting the light source by the display of the computing device includes presenting the light source at a first location on the display, wherein the method further comprises receiving, by the computing device, user input that moves the light source from the first location on the display to a second location on the display, and presenting, by the computing device in response to having received the user input that moves the light source from the first location on the display to the second location on the display, the light source at the second location on the display.

Embodiment 4 is the method of any one of embodiments 1 through 3, wherein selecting the intensity of the light source includes selecting a size of the light source on the display of the computing device.

Embodiment 5 is the method of any one of embodiments 1 through 4, wherein selecting the intensity of the light source includes selecting a brightness of the light source.

Embodiment 6 is the method of any one of embodiments 1 through 5, wherein the method further comprises identifying, by the computing device, a portion of the first image that represents a person, wherein determining the brightness of the at least part of the first image includes determining the brightness of the portion of the first image that represents the person.

Embodiment 7 is the method of any one of embodiments 1 through 6, wherein the method further comprises determining, by the computing device, a color mix of a user interface that is presented by the display, and selecting, by the computing device, a color of the light source to compensate for the color mix of the user interface, in order to affect a color of an illumination that is generated by the display, wherein the presented light source has the color that was selected to compensate for the color mix of the user interface.

Embodiment 8 is the method of any one of embodiments 1 through 7, wherein the method further comprises transmitting, by the computing device, the second image for display on a second computing device, receiving, by the computing device, a video stream of images from the second computing device, and displaying, by the computing device, the received video stream of images on the display, concurrent with the presentation of the light source by the display.

Embodiment 9 is the method of any one of embodiments 1 through 8, wherein the method further comprises presenting, by the computing device, the second image on the display of the computing device concurrent with the presented light source, receiving, by the computing device, user input to switch the computing device from capturing images using the camera to capturing images using another camera of the computing device, and in response to having received the user input to switch the computing device from capturing the images using the camera to capturing images using the another camera of the computing device: (i) presenting, by the computing device, images captured using the another camera of the computing device on the display of the computing device, and (ii) removing, by the computing device and from the display of the computing device, the presented light source so that the display does not include the presented light source while the images captured using the another camera of the computing device are presented on the display.

Embodiment 10 is the method of any one of embodiments 1 through 9, wherein the method further comprises determining, by the computing device, that the computing device was disconnected from an external power source, or that a battery of the computing device dropped below a threshold power level, changing, by the computing device, the intensity of the light source from a first intensity level to a second intensity level as a result of having determined that the computing device was disconnected from an external power source, or that a battery of the computing device dropped below a threshold power level, wherein the first intensity level is less than the second intensity level, changing, by the computing device, an intensity of another portion of the display of the computing device from a third intensity level to a fourth intensity level as a result of having determined that the computing device was disconnected from the external power source, or that the battery of the computing device dropped below the threshold power level, wherein the third intensity level is greater than the fourth intensity level, and presenting, by the computing device, the light source by the display with the second intensity level, as a result of having changed the intensity of the light source from the first intensity level to the second intensity level.

Embodiment 11 is directed to one or more computer-readable devices having instructions stored thereon, that when executed by one or more processors, cause the performance of actions according to the method of any one of embodiments 1 through 10.

Particular implementations can, in certain instances, realize one or more of the following advantages. A light source provided by a computing device display can compensate for a lack of a separate light source on the same side of the display. As such, a user may have a front-facing light source to accompany a front-facing camera that was unaccompanied by, for example, a LED flash. Further, device manufacturers may design devices without front-facing lights that are separate from the display. An ability of a user to move the light source around the display can prevent inconveniences caused by placement of the light source on the display. An intensity of a light source presented by a computing device display can update in response to changes in lighting conditions of the environment in which the device is situated. An intensity and color of a light source presented by a device display can update in response to changes in brightness and color mix of one or more application interfaces presented by the device, for example, to make sure that a user in the image is sufficiently lit with an appropriate color balance. A consistent and appropriate brightness and color mix can be maintained for images and video captured by a device camera. General screen brightness can be reduced while the intensity of the light source may be increased, to compensate for an effect the reduction in general screen brightness has on overall illumination while conserving power.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
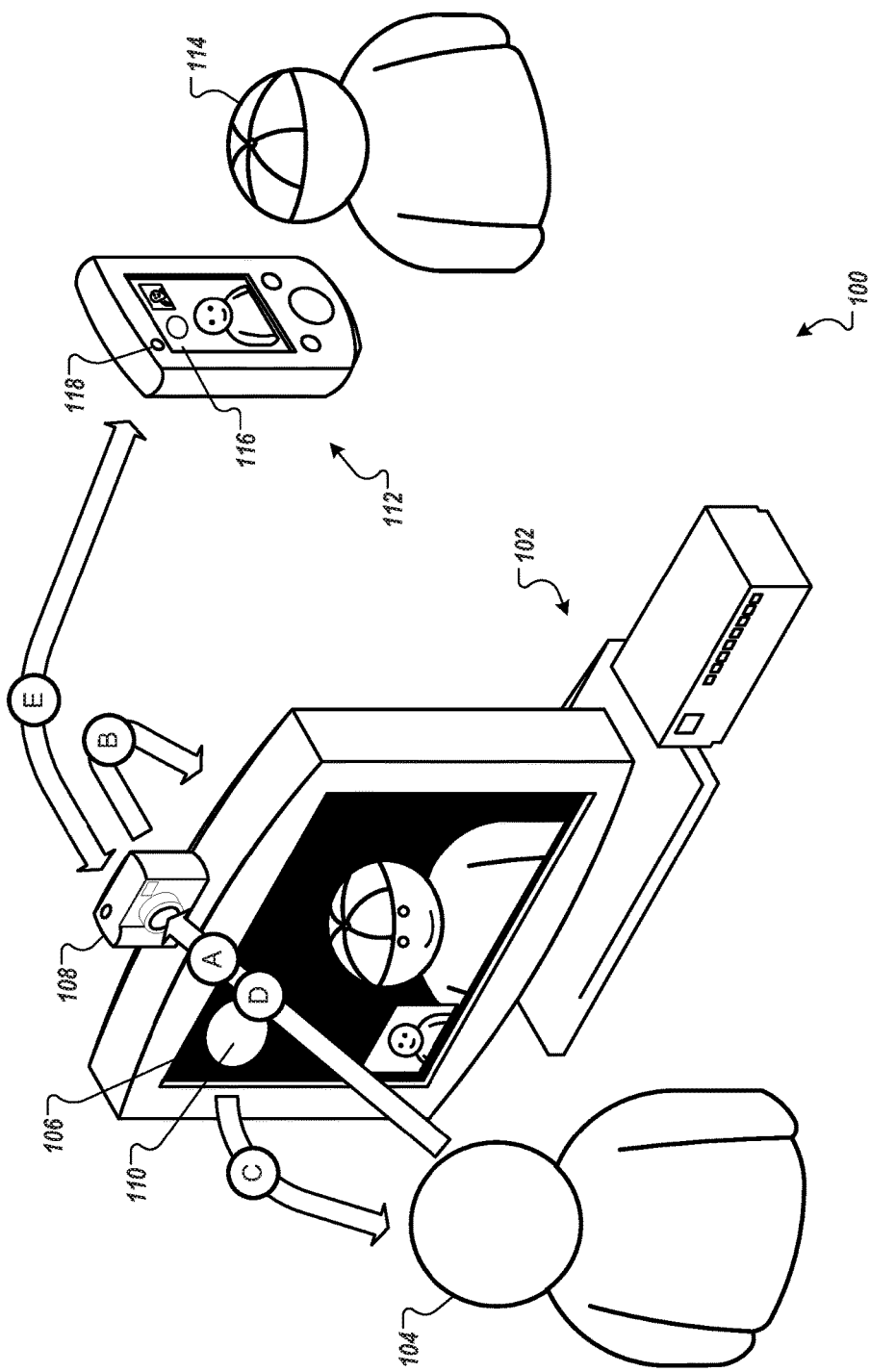
FIG. 1 is a diagram of an example environment in which a display is used as a light source.

This document generally describes using a display as a light source. As an example, a computing device such as a laptop, tablet, or smartphone may include a front-facing camera with which a user is able to take pictures of himself, but the user may be in a dark environment and additional light may be helpful to illuminate the user. The technology described in this document uses a display of the computing device to further illuminate an environment captured by the front-facing camera. Using the display as a light source may be particularly helpful with devices that do not include a light-producing device other than the display on the side of the device with the camera. This is in contrast to how some devices include such a light-producing device (e.g., a light-producing LED) near a back-facing camera on a back of a computing device.

The display can be used as a light source in various ways. In examples in which the computing device is a participating device a video conference, the computing device may present a video that was captured by a camera of another computing device that is participating in the video conference. With such examples, the light source may be a graphical interface element that occupies a portion of the display and that is integrated with the video or to the side of the video. For example, the light source may include one or more shapes that are white or another bright color. The light source may also be a border that surrounds the video or that follows a perimeter of the display. A user may be able to provide user input that moves the light source, for example, by touching the light source on a touchscreen display and dragging the light source to a new location of the touchscreen display. A user may be able to provide user input that resizes a light source, for example, by pinching the light source on a touchscreen display to decrease or increase its size.

In some implementations, the computing device can adjust an intensity of the light source based on characteristics of the environment in which the image or video is being captured by the computing device. For example, the computing device may change the intensity of the light source to ensure that the user or environment that is being captured by the camera is sufficiently lit. The computing device may capture an image and analyze that image to determine whether to increase or decrease an intensity of the light source. The analysis of the image can include determining whether the entire image or one or more portions thereof (e.g., a portion of the image that the computing device has identified as a person or other subject) has an average brightness level that exceeds a determined or threshold brightness level.

Should the analysis of the image indicate that the image or portion thereof is not sufficiently lit, the computing device may increase the intensity of the light source. Conversely, should the image or portion thereof be overly lit, the computing device may decrease the intensity of the light source. This process can repeat, analyzing multiple successive images of a captured video and continuously or regularly adjusting an intensity of the light source to ensure that the user or environment is sufficiently lit. In some examples, the computing device uses a light sensor of the computing device (e.g., a front-facing light sensor) that is separate from the front-facing camera of the computing device to identify environmental brightness levels for use in the above-described brightness-determination process.

Increasing the intensity of the light source can include increasing a size of the light source (e.g., increasing a diameter of a white circle on the display or a width of a white border region that surrounds the video or is at a perimeter of the display). Increasing the intensity of the light source can include increasing a user-perceived brightness of the light source, in order to affect the level of light emitted by the light source, for example, by changing a shade of the light source (e.g., from gray to white or vice versa) so that the LCD portion of the display permits a greater amount of light generated by a backlight to emit into the environment. Increasing the intensity of the light source can also include increasing an intensity of a backlight of the display. In some examples, should the computing device increase the intensity of the backlight, the entire display (including both the video and the light source) may appear at an increased intensity level. In some examples, the computing device may darken the shade of pixels outside of the light source portion of the display so that the light source may appear to increase in brightness while the rest of the display (including the video) may appear to remain at a same or substantially same brightness level.

In some implementations, the computing device can adjust a tint (e.g., a color) of the light source based on characteristics of the environment in which the video is being captured. As an example, should the display present one or more red graphical objects (e.g., as part of the displayed video or as part of other regions of the display), the user or environment that is being captured by the computing device may appear to have a red tint in images that are captured by the camera. The computing device can modify the tint of the light source portion of the display in order to compensate for the red that is produced by the display. Because green is the complimentary color to red (i.e., because green is opposite red on a color wheel), introducing a green tint to the light source can cancel out the red effect caused by the other portion of the display.

The computing device can select a tint for the light source by analyzing the image that is produced by the display. For example, the computing device may take a screen capture of an image that is produced by the display and determine a color mix (e.g., average color hue, saturation, and/or value) of the entire image or a portion thereof (e.g., a portion excluding the light source, a video chat user interface portion of the display, etc.). The computing system can determine a color that is complimentary to the determined color mix of the display or the portion thereof, and that determined color can be presented as the primary or average tint of the light source (or can at least be used in a determination of a tint of the light source). In some implementations, the computing device can select a tint for the light source by analyzing an image captured by the camera of the computing device, for example, to identify whether the environment has a red tint. In some examples, the computing device may not have knowledge of an unaltered color of the environment and analysis of images of the captured environment are analyzed over time to determine how the color changes (e.g., from neutral to red as the display changes), or such analysis of images of the captured environment are used in conjunction with analysis of the presentation by the display.

In some implementations, the computing device moves the light source in response to other computing device events. For example, should the user or computing device resize the video so that the video may expand into a region of the display at which the light source was present, the computing device may automatically move the light source so that the light source does not obscure the video or a portion of the video. On the other hand, should the computing device display the light source near the video and should the computing device increase a size of the light source to increase its intensity, the light source may automatically (without user input) move so that the enlarged light source does not obscure the displayed video or portion thereof. In some examples, the computing device turns the light source off (e.g., removes the light source from the display) in response to user input that switches from use of the front-facing camera to use of the rear-facing camera, and turns the light source on in response to user input that switches from use of the rear-facing camera to use of the front-facing camera.

In some implementations, an intensity of the light source is affected by a reliance of the computing device on battery power. For example, should the computing device be not plugged into external power and should the battery be below a threshold battery level, the computing device may limit an intensity of the light source to at or below a certain intensity level, in order to limit battery drain.

These and other features of technology for using a display as a light source are described below, with reference to the figures.

FIG. 1 is a diagram of an example environment 100 in which a display is used as a light source. FIG. 1 also illustrates an example flow of data, shown in stages (A) to (E). Stages (A) to (E) may occur in the illustrated sequence, or they may occur in a sequence that is different than in the illustrated sequence. In some examples, two or more stages may occur concurrently.

As shown in FIG. 1, the example environment 100 includes a computing device 102 operated by a user 104, and a computing device 112 operated by a user 114. The computing devices 102 and 112, for example, can be any appropriate computing device, such as a desktop computer, a laptop computer, a tablet computer, a smartphone, or another sort of computing device. The computing device 102, for example, includes a display 106 and a camera 108. Each of the display 106 and the camera 108 can be integrated with the computing device 102, for example, or can be external to the computing device and in data communication with the computing device by a wired or wireless connection. Similarly, the computing device 112 includes a display 116 and a camera 118. Peripherals that are in wireless communication with a main portion of a computing device but are not in physical contact with that main portion of the computing device may be considered part of the computing device.

Referring to the example flow of data, during stage (A), the camera 108 of the computing device 102 captures an image of the user 104. For example, the captured image may be a single static image, or may be a frame of a captured video. The capture of image(s) by the camera 108 can be in response to an input command (e.g., an interface selection, a voice command, or another appropriate input) provided by the user 104 to the computing device 102. For example, the user 104 may provide a command to the computing device 102 to take a self-portrait photograph or video. As another example, the user 104 may provide a command to the computing device 102 to initiate or join a real-time video chat session with one or more additional users.

During stage (B), the computing device 102 receives the image(s) captured by the camera 108, determines a brightness of at least a portion of the image (e.g., a value corresponding to a measured intensity of image pixels, such as a brightness value, a grayscale value, one or more color values, or other suitable values), and selects an intensity of a light source (e.g., a luminous intensity as perceived by human eyes) that is to be presented by the display 106. Determining the image brightness, for example, may include determining an average brightness of the received image or an average brightness of part of the received image (e.g., a portion that represents the user 104 or the face of the user 104). If the determined image brightness meets a predetermined threshold, for example, the computing device 102 can determine that a light source is to be presented and can select an intensity of the light source. In general, the selected intensity of the light source may be inversely proportional to the determined image brightness. That is, if the image brightness is determined as being low, the selected intensity of the light source may be high, whereas if the image brightness is determined as being high (yet meets the predetermined threshold), the selected intensity of the light source may be low. In the present example, the computing device 102 determines that the image of the user 104 captured by the camera 108 has an average brightness that meets the threshold (e.g., is within a predetermined range of brightness values, grayscale values, or color values), and selects an appropriate intensity of the light source based on the determined brightness.

During stage (C), the computing device display 106 of the computing device 102 presents a light source 110, the light source 110 having the selected intensity. In some examples, the light source 110 can be a shape (e.g., circle, square, lightbulb, border, or another appropriate shape) having a single color (e.g., white, gray, or a particular RGB (red, green, blue) value) that is rendered by the display 106 along with an application interface (e.g., a video chat window) presented by the display. For example, the shape can be rendered within the application interface (e.g., within the video chat window), outside the application interface (e.g., to the side of the video chat window or in a secondary window), as a border of the application interface, or at the perimeter of the display 106.

In some examples, the light source 110 can include multiple light sources. For example, each of the multiple light sources can have a different primary color, such as a first light source having a red color component, a second light source having a green color component, and a third light source having a blue color component. In some examples, distributed light sources (e.g., each of the same size, between one and 40 pixels each) can be distributed throughout a display area (e.g., an application interface or an entire screen) and rendered by the display 106. For example, a percentage (e.g., 5%, 10%, 20%, or another suitable percentage) of screen pixels can be designated as light sources, distributed evenly throughout the display 106, while the remaining screen pixels render application output. In general, selecting the intensity of light source(s) may include selecting a size of the light source(s) (e.g., by selecting a total screen area of one or more light sources, or a number of screen pixels designated as light sources), selecting a brightness of the light source(s) (e.g., by selecting an output of a backlight or a tint of pixels that may obscure backlight output), or selecting a combination of the two attributes.

During stage (D), the computing device 102 receives subsequent image(s) captured by the camera 108 while presenting the light source 110 on the display 106 having the selected intensity. For example, the light source 110 presented on the display 106, combined with light from one or more application interfaces presented on the display 106, can radiate into an environment of the display 106 (e.g., onto the user 104 and any physical objects that surround the user), and can affect the brightness of subsequent images captured by the camera 108. The subsequent images can be continually (e.g., every frame of a video) or periodically (e.g., ten times per second, once per second, or another suitable interval) analyzed to determine image brightness (and optionally, color mix) as it may change over time. For example, the brightness and color mix of a displayed application interface may change, and/or lighting conditions of the environment of the display 106 may change. An intensity (and optionally, color) of the light source presented by the display 106 can be updated in response to such changes, such that a consistent brightness (and color mix) can be maintained for images and video captured by the camera 108.

During stage (E), the computing device 102 transmits one or more images for display by one or more other computing devices, while receiving and rendering video streams from the other computing devices, and while presenting the light source 110 on the display 106. For example, the user 104 and the user 114 can engage in a video chat session using respective computing devices 102 and 112. During the video chat session, for example, a video stream captured by the camera 108 can be transmitted (e.g., over a wired and/or wireless network) from the computing device 102 to the computing device 112, while a video stream captured by the camera 118 may be transmitted from the computing device 112 to the computing device 102. Video of the user 114 can be rendered by the display 106 while video of the user 104 is rendered by the display 116, for example, facilitating a real-time conversation between the users 114 and 104. Each display may also show the video captured by the camera of each respective device, for example, a "selfie" video so that the users can view the video stream that is being sent to the other party.

When operating in a low-light environment, for example, the display 106 may serve as a primary source of light for images or video captured by the camera 108—that is, the light source 110 can be rendered by the display 106 in addition to one or more application interfaces (e.g., a video chat window), and an intensity of the light source 110 can be selected to supplement light in the environment and light provided by the application interface(s). In some examples, and as discussed in further detail below, a color of the light source 110 can be selected to compensate for a color mix of the application interface(s), such that the light source 110 corrects for potential color shift under various lighting conditions.

In the present example, computing devices 102 and 112 are shown, however, other examples may include additional computing devices or a single computing device. For example, a single computing device may be used to capture and record video and/or static images and still provide a light source 110 that is user-manipulable and that is automatically adjusting, as described throughout this disclosure. As another example, many computing devices may be used to conduct a video chat session which includes many users.

In various examples, the use of a display as a light source may be implemented as a standalone application, an application feature that integrates into other appropriate applications, or at an operating system level. For example, a standalone application may be used in conjunction with (e.g., can hover over) other applications, and the standalone application may be launched by a user when desired or may be launched automatically under particular conditions (e.g., low-light conditions). When implemented as an application feature, for example, the feature can be included with applications that can appropriately make use of a display as a light source (e.g., video chat applications). When implemented at an operating system level, for example, an API (application program interface) can be provided such that application developers can integrate the feature.

Figure 2:
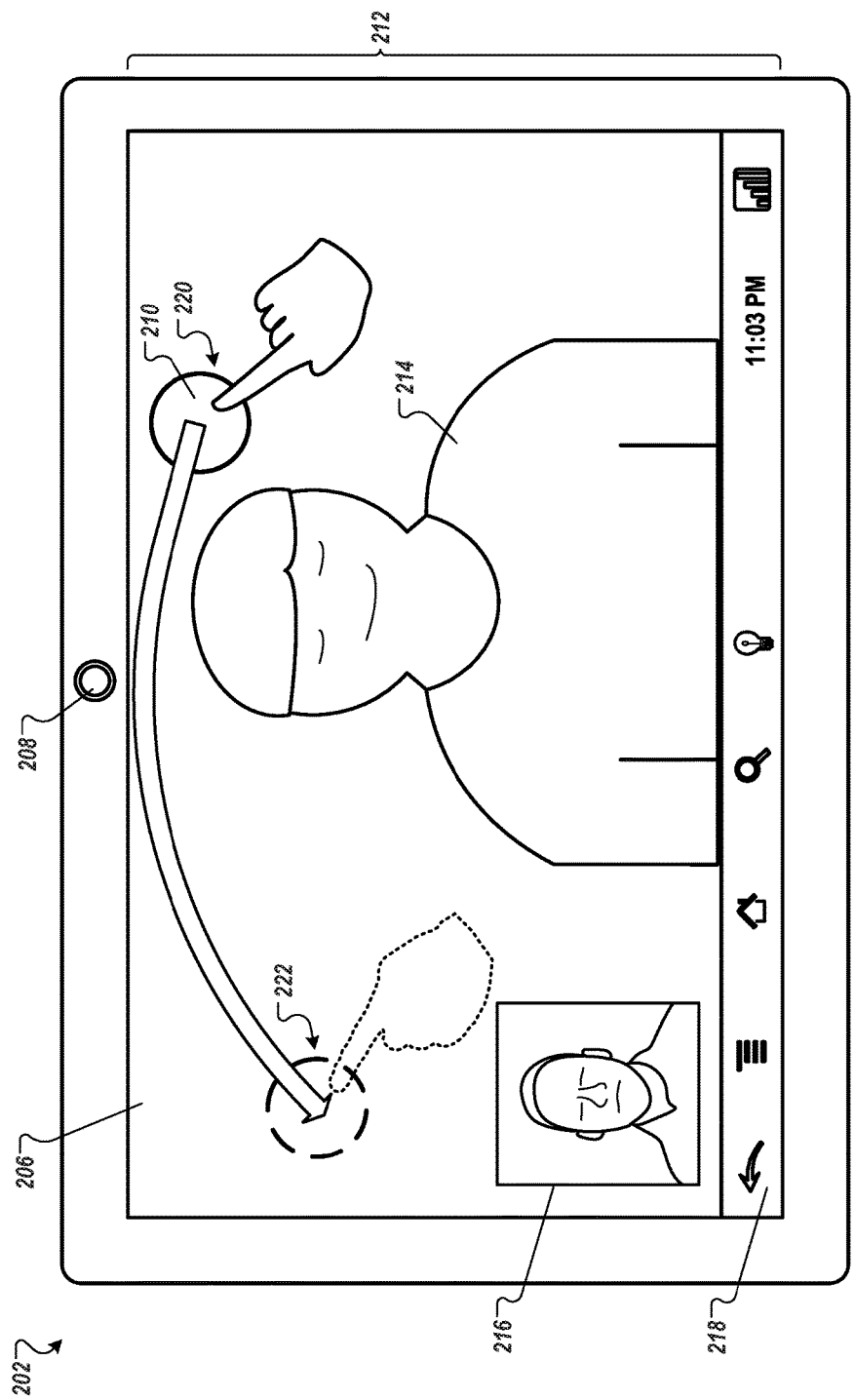
FIG. 2 shows a user providing touch input for moving a light source that is provided by a display of a computing device.

FIG. 2 shows a user providing touch input for moving a light source 210 provided by a display 206 of a computing device 202. The computing device 202 (e.g., similar to the computing devices 102, 112, shown in FIG. 1), for example, can include the display 206 and a camera 208, which can be used to capture images or video of a user. In some examples, the computing device 202 can be used to capture digital photographs, digital video, or to facilitate real-time video chat sessions with one or more additional users. During a video chat session, for example, the camera 208 of the computing device 202 can capture video of a user while the device receives and displays a video stream of images of another user from another computing device. In the present example, an application interface 212 (e.g., an interface of the video chat session) presented by the display 206 includes the light source 210, a video image 214 from another computing device, a video image 216 of a user of the computing device 202, and user interface controls 218 for configuring the application and/or the light source 210.

In some examples, the application interface 212 can receive user input that indicates that the light source 210 is to be moved, and in response, the computing device 202 can move the light source. For example, the computing device 202 can initially present the light source 210 at a default location 220 (e.g., a location specified by a user or a location determined by an application). The user can provide touch input for moving the light source 210, for example, by selecting the light source (e.g., by contacting the light source 210 on the display 206 with a touch of a finger) and by moving the selected light source (e.g., by providing a dragging gesture across the display 206) to an updated location 222. As another example, an input device (e.g., a computer mouse) can be used to select the light source 210 and to update the location of the light source. In response to the user input, for example, the computing device 202 can move the light source 210 to correspond to a position of the user input as it moves across the display 206. The light source can also move in response to user selection of user interface elements (e.g., arrow buttons, or buttons that toggle the location of the light source from one corner to another).

In some examples, the light source 210 may automatically move. For example, an application executed by the computing device 202 or an operating system of the computing device can determine that the light source 210 obscures a particular portion of an application interface rendered by the display 206 or would obscure a particular portion of an application interface in response to an event (e.g., a resizing of the application interface), and in response, can move the light source to an updated location 222 away from the particular portion. If the application interface 212 includes a rendered video stream, for example, the computing device 202 can perform facial detection to identify a location of a face in the video stream, and the device can automatically move the light source 210 away from the location of the face such that the face is not obscured by the rendered light source.

As another example, an application executed by the computing device 202 or an operating system of the computing device can determine that the video or application interface 212 (or a window of the interface) has been or is about to be moved and/or resized, and in response, can automatically move the light source 210 to maintain the relative position of the light source within the interface, outside of the interface, or at the periphery of the interface.

In some examples, a user may configure the light source 210 using the user interface controls 218. For example, the user interface controls 218 can include a control by which user input is able to specify a default location of the light source 210, a control by which the light source 210 is manually moved, a control by which user input is able to select an option to enable or disable automatic movement of the light source 210, or controls by which other appropriate configuration settings may be provided.

Figure 3:
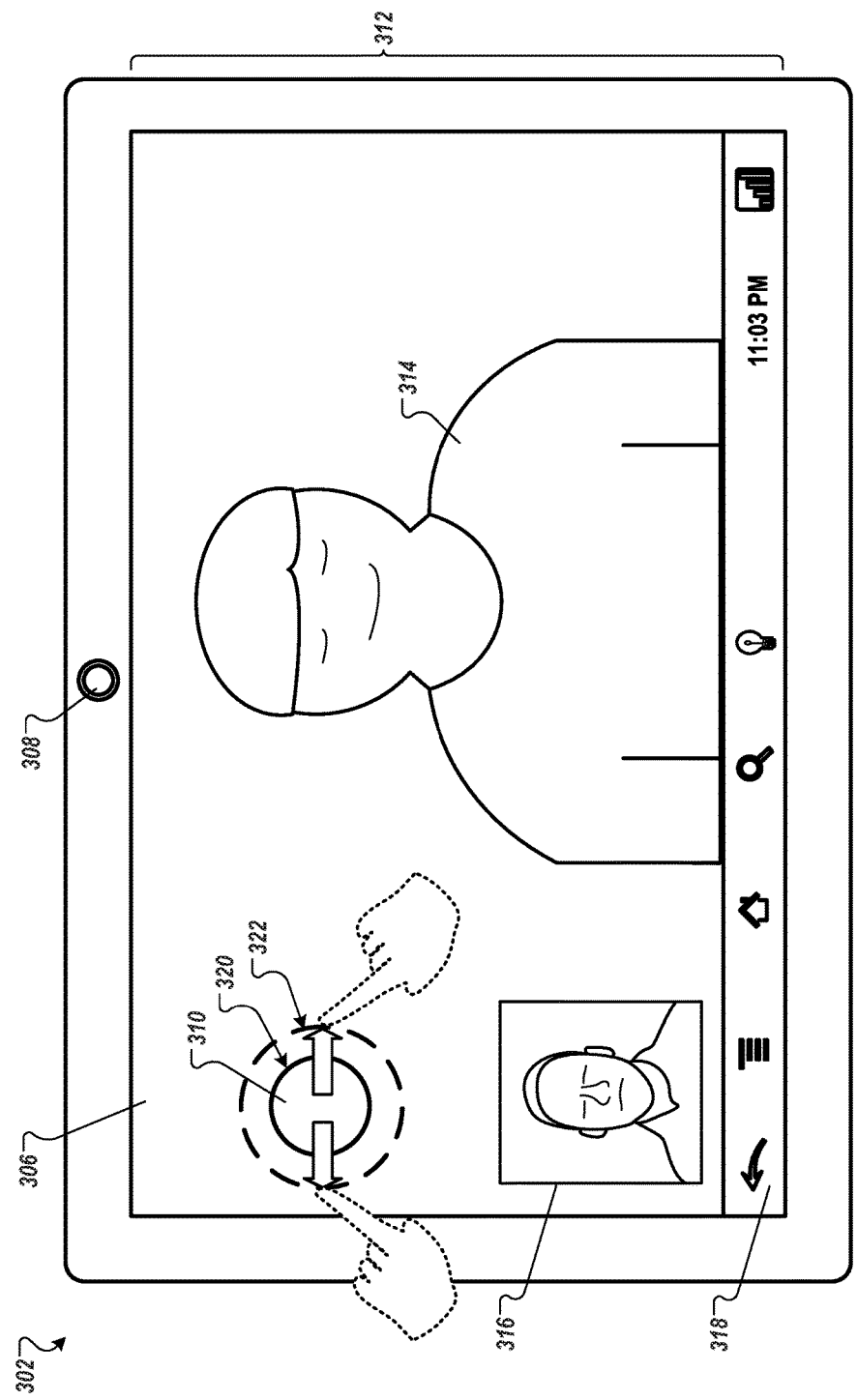
FIG. 3 shows a user providing touch input for resizing a light source that is provided by a display of a computing device.

FIG. 3 shows a user providing touch input for resizing a light source 310 that is provided by a display 306 of a computing device 302. The computing device 302 (e.g., similar to the computing devices 102, 112, shown in FIG. 1), for example, can include the display 306 and a camera 308, which can be used to capture images or video of a user. In some examples, the computing device 302 can be used to capture digital photographs, digital video, or to facilitate real-time video chat sessions with one or more additional users. During a video chat session, for example, the camera 308 of the computing device 302 can capture video of a user while the device receives and displays a video stream of images of another user from another computing device. In the present example, an application interface 312 (e.g., an interface of the video chat session) presented by the display 306 includes the light source 310, a video image 314 from another computing device, a video image 316 of a user of the computing device 302, and user interface controls 318 for configuring the application and/or the light source 310.

In some examples, the application interface 312 can receive user input that indicates that the light source 310 is to be resized, and in response, the computing device 302 can resize the light source. For example, the computing device 302 can initially present the light source 310 with a default size 320 (e.g., a size specified by a user or a size determined by an application or another process). The user can provide touch input for resizing the light source 310, for example, by selecting the light source (e.g., by contacting the light source 310 on the display 306 with a touch of one or more fingers) and by resizing the selected light source to an updated size (e.g. by providing a pinching gesture on the display 306). For example, pinching fingers together can decrease the size of the light source, while spreading the fingers apart can increase the size of the light source. User input can also select one or more other user interface elements to change the size of the light source (e.g., "+" and "−" user interface elements). As another example, an input device (e.g., a computer mouse) can be used to select the light source 310 and to update the location of the light source. In response to the user input, for example, the computing device 302 can increase or reduce the size of the light source 310 to correspond to a position of the user input as it contacts the display 306. In some examples, instead of changing the size of the light source, the above-described actions can increase or decrease a brightness of the light source (e.g., selecting a "+" button can increase the brightness of the light source).

In some examples, the light source 310 can automatically change in size. For example, an application executed by the computing device 302 or an operating system of the computing device can determine that one or more images received by the camera 308 has a brightness value that falls outside of a target range of brightness values, and in response, can appropriately present, remove, or resize the light source 310 rendered by the display 306. When determining the brightness values of images (or image portions), for example, the computing device 302 can determine an average brightness of a single image (e.g., a frame of a video), or an average brightness of a sequence of images (e.g., a series or sampling of video frames). For example, every video frame or every $n^{th}$ video frame of a video stream over a predetermined time period (e.g., the past second, the past two seconds, or another suitable time period) can be analyzed to determine average brightness values for each frame, and the average brightness values can be aggregated to determine an average brightness value of the video stream over the time period. If the average brightness value of the video stream over the time period is under a lower threshold value of the target range of brightness values, for example, an intensity of light source 310 can be increased, for example, by increasing the brightness or size of the light source 310 (and/or the light source 310 can be presented). If the average brightness value of the video stream over the time period is over an upper threshold value of the target range of brightness values, for example, an intensity of the light source 310 can be decreased, for example, by decreasing the brightness or size of the light source 310 (and/or the light source 310 can be removed).

In some examples, the user interface controls 318 can be used to configure the light source 310. For example, the user interface controls 318 can include a control by which a default size of the light source 310 is selected, a control by which the light source 310 is manually moved, a control by which an option to automatically resize (and/or present) the light source 310 is enabled or disabled, one or more controls by which image brightness value thresholds are specified, or controls by which other appropriate configuration settings may be provided.

Figure 4:
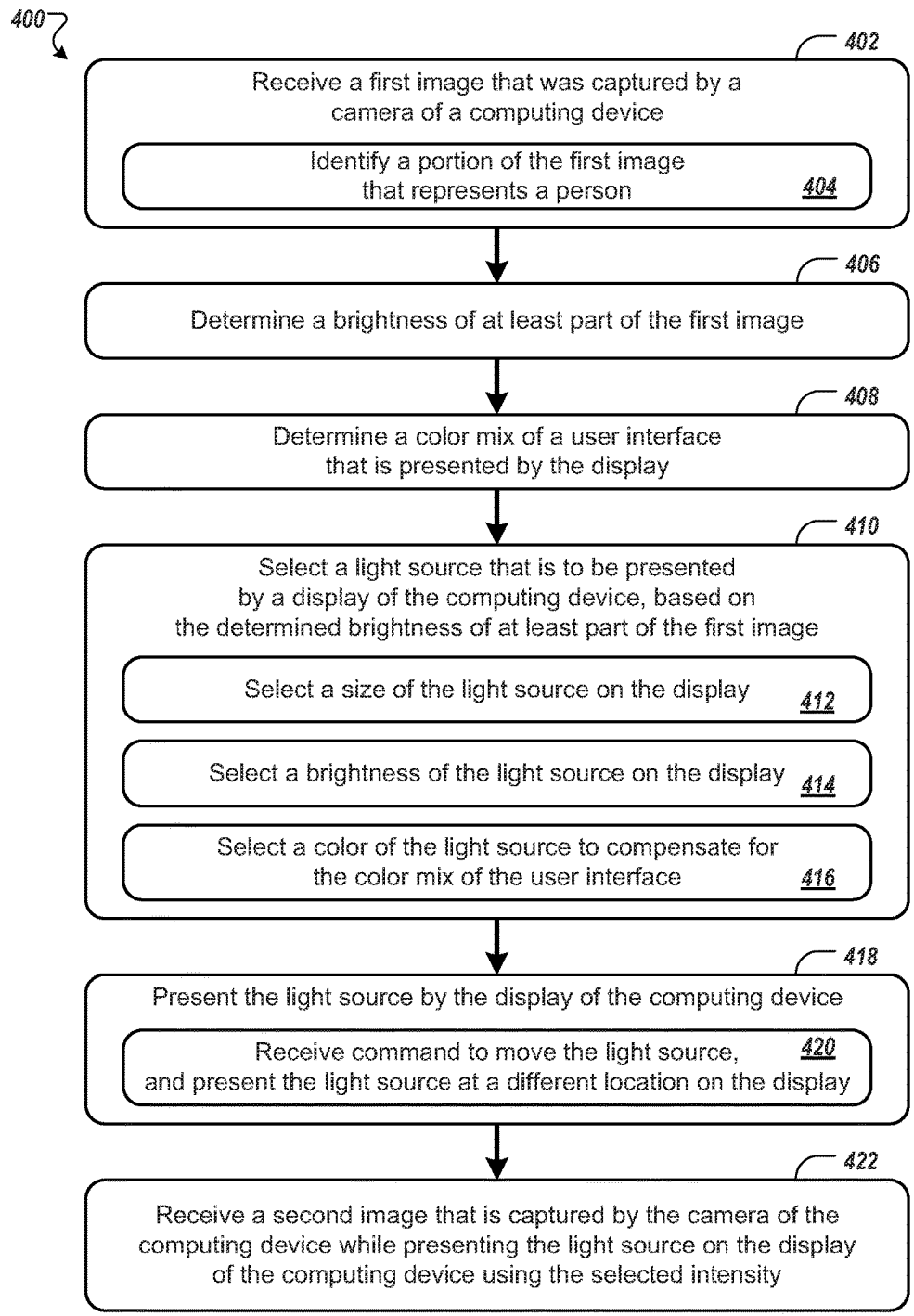
FIG. 4 shows a flowchart of an example method for using a display as a light source.

FIG. 4 shows a flowchart of an example method 400 for using a display as a light source. The method 400 is further described throughout this disclosure, for example, with reference to FIGS. 1-3.

At box 402, a computing device receives a first image that was captured by a camera of the computing device (e.g., a camera that is integrated with or that is separate from but that is in communication with the computing device). Referring to FIG. 1, for example, the computing device 102 can receive an image of the user 104 captured by the camera 108. For example, the captured image may be a single static image, or may be a frame of a captured video of the user 104.

At box 404, a portion of the first image that represents a person can be identified. For example, the computing device 102 can use object detection techniques to identify a portion of the first image that includes the face or head or body of the user 104. The portion of the first image can include pixels of the image that are included in an area of the image that corresponds to the detected face of the user 104, for example.

At box 406, the computing device determines a brightness of at least part of the first image. The computing device 102, for example, can determine a brightness of one or more images or video received by the camera 108. In some examples, determining the brightness may include determining an average brightness of the first image or part of the first image (e.g., the portion that represents the person or the face of the person). For example, all the image pixels (or the pixels included in the portion that represents the person) can be averaged, and an average value (e.g., average brightness, average color value) can be identified as the image brightness. As another example, the first image or a portion of the first image can be sampled to identify a subset of pixels of the first image, and the subset of pixels can be averaged. As another example, the first image (or a portion of the first image) can be converted to a different color space (e.g., grayscale, HSB (hue, saturation, brightness) space), the image pixels or a portion of the image pixels can be averaged, and an appropriate measure of brightness (e.g., gray value, brightness value) can be identified as the image brightness.

At box 408, the computing device determines a color mix of a user interface that is presented by a display of the computing device. For example, the computing device 102 can determine a color mix of the entire display or of an application interface (e.g., a video chat user interface) presented by the display 106 of the computing device. In general, the color mix may depend on various colors of various onscreen elements of the application interface, such as application windows, video chat windows, and other onscreen elements. To determine the color mix of the application interface presented by the display 106, for example, an image of the display or application interface can be continually or periodically identified (e.g., by screen capture, by accessing a frame buffer of video memory, or another appropriate technique), and the computing device can analyze the image of the display or application interface to determine an average or dominant color mix of the interface. Techniques for determining a dominant color mix, for example, can include generating a hue histogram for the application interface, dynamic bucketing, or other appropriate techniques.

At box 410, the computing device selects a light source that is to be presented by a display of the computing device. In general, an intensity of the light source can be selected by the computing device based on the determined brightness of at least part of the image, and the selected intensity may be inversely proportional to the determined image brightness. That is, if the image brightness is determined as being low, the selected intensity of the light source may be high, whereas if the image brightness is determined as being high, the selected intensity of the light source may be low. For example, the computing device 102 can select a light source for the display 106 to present, based on an average brightness of the first image or part of the first image (e.g., the portion that represents user 104, such as the portion that represents the user's face), such that the light source is configured to illuminate the user and an attempt is not made to illuminate background features. Example techniques for selecting the intensity of the light source are illustrated in boxes 412, 414, and 416, however, other techniques are described throughout this disclosure. The techniques for selecting the intensity of the light source may include any combination of one or more of the techniques that are described with respect to the flowchart of FIG. 4 or throughout this disclosure.

At box 412, selecting the intensity of the light source can include selecting a size of the light source on the display of the computing device. Referring to FIG. 3, for example, the light source 310 can be automatically presented, removed, or resized, based on the determined image brightness, without the user providing input. Selecting the size of the light source 310, for example, can include determining a total screen area or number of pixels to be included in the light source. In general, a higher selected intensity corresponds to a larger screen area or greater number of pixels to be included in the light source, whereas a lower selected intensity corresponds to a smaller screen area or fewer pixels. A user can also manually change the size of the light source, as described with respect to FIG. 3 and elsewhere in this disclosure.

At box 414, selecting the intensity of the light source can include selecting a brightness of the light source. For example, a brightness of the light source 310 can be a brightness or grayscale value assigned to pixels of the light source. In general, a higher selected intensity corresponds to a high brightness value (e.g., a high white value), whereas a lower selected intensity corresponds to a low brightness value (e.g., a low white value). The computing device can increase or decrease the brightness of the light source with the light source remaining fixed in size.

At box 416, the computing device can select a color of the light source. The color of the light source can be selected to compensate for the color mix of the user interface, in order to affect a color of an illumination that is generated by the display. For example, the color of the light source 310 can be selected by the computing device 302 to compensate for the color mix of the application interface 312, including the video image 314 from another computing device, the video image 316 captured by the camera 308, and the user interface controls 318. As an example, should the application interface 312 have a color mix which is dominated by a particular color, a user or environment that is being illuminated by the display 306 and is being captured by the camera 308 of the computing device 302 may appear to have a tint of that dominant color. The computing device 302, for example, can modify the tint of the light source 310 presented by the display 306 in order to compensate for the dominant color, by introducing a color that is complimentary to the dominant color (e.g., based on a color wheel), thus canceling or at least minimizing a color effect caused by the dominant color.

At box 418, the display of the computing device presents the light source at a first location on the display. The presented light source can have the selected intensity, and can have the color that was selected to compensate for the color mix of the user interface. Referring to FIG. 2, for example, computing device 202 can present the light source 210 on the display 206 at the first location 220. In some examples, the light source that is presented by the display can occupy a portion of the display without occupying all of the display. For example, the light source 210 can be a shape (e.g., circle, square, lightbulb, border, or another appropriate shape) rendered within or outside of the application interface 212, as a border of the application interface, or at the perimeter of the display 206. In some examples, the light source can occupy the entire display for a period of time during which one or more images are captured by a device camera, and after the period of time, the light source is removed. For example, the computing device 202 can be used to take a self-portrait photograph, and the light source 210 can occupy the display 206 while the camera 208 takes the photograph. After the photograph is taken, for example, the light source can be removed from the display and the photograph can be presented.

At box 420, the computing device can receive a command to move the light source, and can present the light source at a different location on the display. In some examples, user input can be received by the computing device that moves the light source from the first location on the display to a second location on the display. In response to having received user input (e.g., touch input, input provided using an input device, or other appropriate types of input), for example, the computing device 202 can move the light source 210 away from the location 220, and can present the light source at the second location on the display (e.g., the updated location 222). The moved light source 210 may have the same shape as before, but may be located at a different position. In some examples, the computing device can automatically move the light source. For example, if the computing device 202 determines that the light source 210 obscures or would obscure a particular portion of the application interface 212, or if the interface is moved and/or resized, the computing device 202 can automatically move the light source 210 to a suitable updated location.

At box 422, the computing device receives a second image that is captured by the camera of the computing device while the computing device is presenting the light source on the display using the selected intensity. Referring again to FIG. 1, for example, after presenting the light source 110 on the display 106, the computing device 102 can receive additional images or video captured by the camera 106. The additional images or video are illuminated at least in part by the light source 110, for example, which may be adjusted in intensity and color by the computing device 102, in response to changes in image brightness and a color mix of an application interface presented by the display 106.

In some examples, the method may include transmitting the second image for display on a second computing device, receiving a video stream of images from the second computing device, and displaying the received video stream of images on the display, concurrent with the presentation of the light source by the display. For example, the computing device 102 can transmit the second image (or a video stream including the second image) to the computing device 112, and can receive a video stream of images from the computing device 112. The video stream of images received from the computing device 112 can be rendered by the display 106, for example, concurrent with the presentation of the light source 110 by the display.

In some examples, the method may include presenting the second image on the display of the computing device concurrent with the presented light source, and receiving user input to switch the computing device from capturing images using the camera to capturing images using another camera of the computing device. For example, the computing device 112 (e.g., a smartphone) can include the camera 118 (e.g., a front-facing camera, having a lens that faces the user 114) and another camera (e.g., a rear-facing camera (not shown), having a lens that faces away from the user 114). When the camera 118 is in use during a video chat session, for example, a first portion of the display 116 may include a video stream of images of the user 114 captured by the camera 118, a second portion of the display 116 may include a video stream of images received from the computing device 102, and a third portion of the display 116 may include a presented light source. In response to having received the user input, for example, the computing device can present images captured using the other camera of the computing device on the display of the computing device, and can remove the presented light source so that the display does not include the presented light source while the images captured using the other camera of the computing device are presented on the display. For example, in response to receiving input (e.g., a control selection, a voice command, or another appropriate type of input) from the user 114 to switch to another camera (e.g., from a front-facing camera to a rear-facing camera), the computing device 112 can update the first portion of the display 116 to include a video stream of images captured by the other camera, and the computing device 112 can remove the presented light source from the display 116.

In some examples, the method may include determining that the computing device was disconnected from an external power source, or that a battery of the computing device dropped below a threshold power level. For example, the computing device 112 can be unplugged from an electrical charging device, or a battery of the computing device can drop below 5%, 10%, 20%, or another appropriate threshold level. As a result of having determined that the computing device 112 was disconnected from an external power source, or that a battery of the computing device dropped below a threshold power level, for example, the intensity of the light source can be changed from a first intensity level (e.g., a low level) to a second intensity level (e.g., a high level). To conserve device power, for example, general screen brightness can be reduced by the computing device 112 while the intensity of the light source presented by the display 116 is increased, to compensate for an effect the reduction in general screen brightness has on overall illumination. As a result of having changed the intensity of the light source from the first intensity level to the second intensity level, for example, the display 116 of the computing device 112 can present the light source with the second intensity level.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 5:
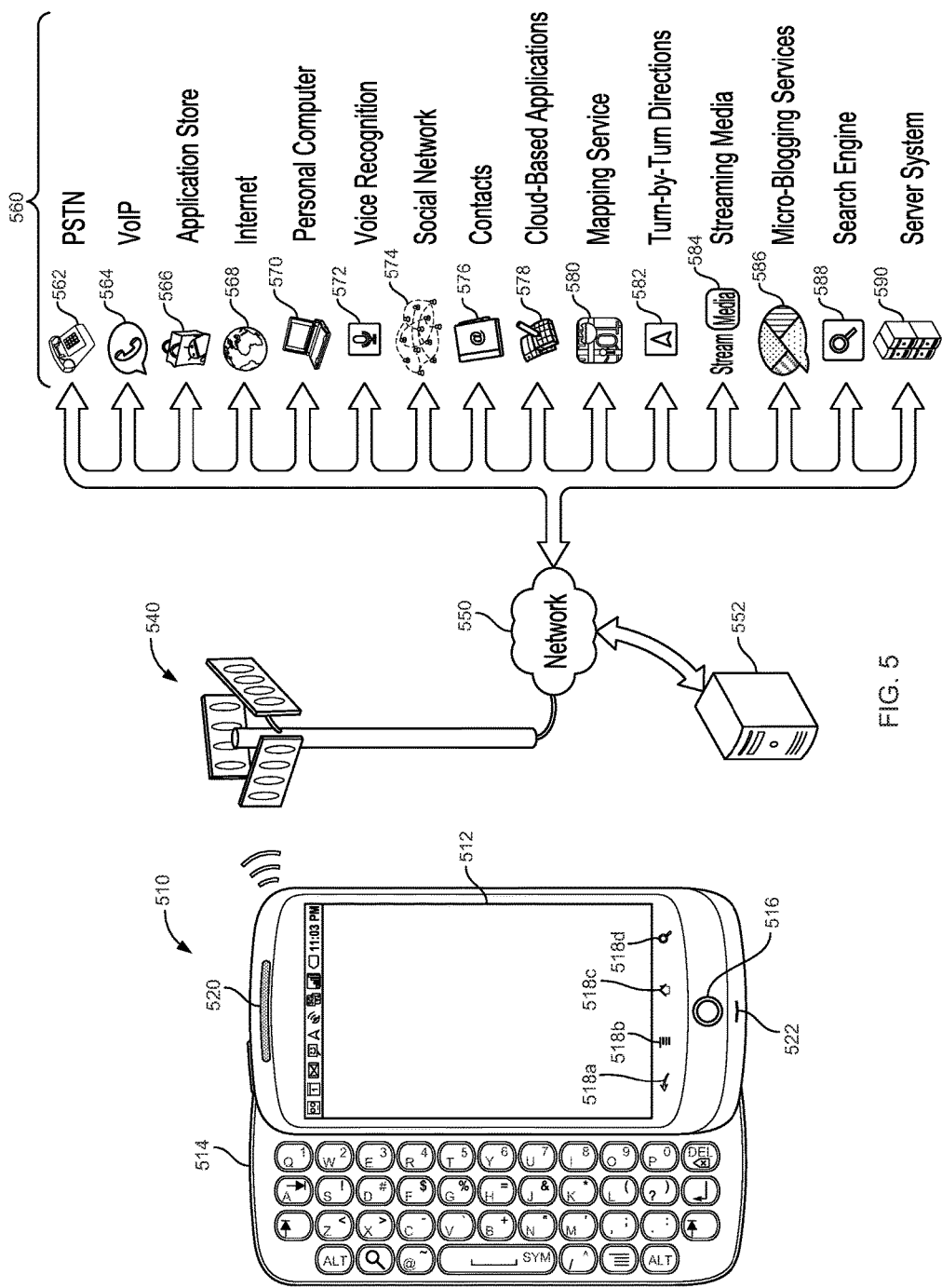
FIG. 5 is a conceptual diagram of a system that may be used to implement the systems and methods described in this document.

Referring now to FIG. 5, a conceptual diagram of a system that may be used to implement the systems and methods described in this document is illustrated. In the system, mobile computing device 510 can wirelessly communicate with base station 540, which can provide the mobile computing device wireless access to numerous hosted services 560 through a network 550.

In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" graphical user interface that is displayed after turning on the mobile computing device 510, after activating the mobile computing device 510 from a sleep state, after "unlocking" the mobile computing device 510, or after receiving user-selection of the "home" button 518c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 510 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 510 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., ETHERNET, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 6:
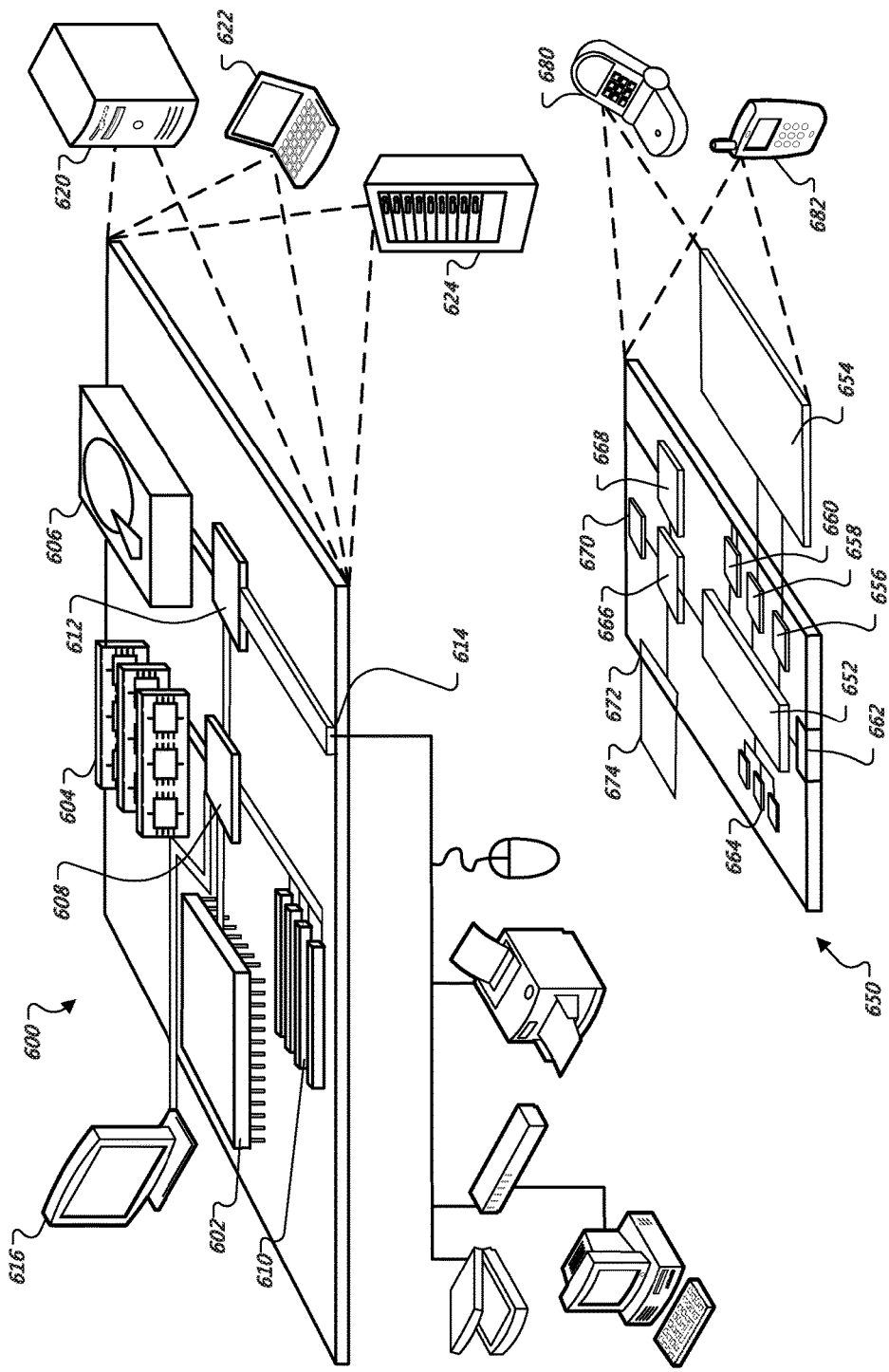
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provided, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   receiving, by a computing device, a first image that was captured by a camera of the computing device;
   determining, by the computing device, a brightness of at least part of the first image that was captured by the camera of the computing device;
   selecting, by the computing device, a first intensity of a light source based on the determined brightness of the at least part of the first image that was captured by the camera of the computing device;
   displaying, by the display of the computing device and in response to having received the first image and having determined the brightness of the at least part of the first image, a first presentation of a user interface that includes:
   (i) the light source, wherein the light source is presented with the selected first intensity that is based on the determined brightness of the at least part of the first image that was captured by the camera of the computing device, wherein the light source occupies a first portion of the user interface and does not occupy all of the user interface,
   (ii) a first video stream of images that were captured by a camera of a second computing device, wherein the first video stream of images occupies a second portion of the user interface that is different than the first portion of the user interface, and
   (iii) a second video stream of images that presents the first image that was captured by the camera of the computing device, wherein the second video stream of images occupies a third portion of the user interface that is different than the first and second portions of the user interface;
   receiving, by the computing device, a second image that is captured by the camera of the computing device while the computing device is displaying the first presentation of the user interface that includes the presentation of the light source using the selected first intensity;
   determining, by the computing device, a brightness of at least part of the second image that is captured by the camera of the computing device while the computing device is displaying the first presentation of the user interface;

selecting, by the computing device, a second intensity of the light source based on the determined brightness of the at least part of the second image that is captured by the camera of the computing device; and displaying, by the display of the computing device and in response to having received the second image and having determined the brightness of the at least part of the second image, a second presentation of the user interface that includes:
  (i) the light source, wherein the light source is presented with the selected second intensity that is based on the determined brightness of the at least part of the second image that is captured by the camera of the computing device, such that the light source in the second presentation of the user interface increases in brightness with respect to the presentation of the light source in the first presentation of the user interface,
  (ii) the first video stream of images that were captured by the camera of the second computing device, wherein the first video stream of images remains at a same brightness level or at a reduced brightness level with respect to brightness of the first video stream of images in the first presentation of the user interface, and
  (iii) the second video stream of images that presents the second image that is captured by the camera of the computing device.

2. The computer-implemented method of claim 1, wherein the light source is presented at a first location on the user interface, wherein the method further comprises:
  receiving, by the computing device, user input that moves the light source from the first location on the user interface to a second location on the user interface;
  presenting, by the computing device in response to having received the user input that moves the light source from the first location on the user interface to the second location on the user interface, the light source at the second location on the user interface.

3. The computer-implemented method of claim 1, wherein selecting the intensity of the light source includes selecting a size of the light source on the user interface.

4. The computer-implemented method of claim 1, wherein selecting the intensity of the light source includes selecting a brightness of the light source.

5. The computer-implemented method of claim 1, further comprising identifying, by the computing device, a portion of the first image that represents a person;
  wherein determining the brightness of the at least part of the first image includes determining the brightness of the portion of the first image that represents the person.

6. The computer-implemented method of claim 1, further comprising:
  determining, by the computing device, a color mix of the user interface that is displayed by the display; and
  selecting, by the computing device, a color of the light source to compensate for the color mix of the user interface, in order to affect a color of an illumination that is generated by the display,
  wherein the light source has the color that was selected to compensate for the color mix of the user interface.

7. The computer-implemented method of claim 1, further comprising:
  transmitting, by the computing device, at least one of the images captured by the camera of the computing device, for display on the second computing device; and
  receiving, by the computing device, the first video stream of images from the second computing device, wherein the received first video stream of images is presented on the user interface concurrent with the light source.

8. The computer-implemented method of claim 1, further comprising:
  receiving, by the computing device, user input to switch the computing device from capturing images using the camera to capturing images using another camera of the computing device; and
  in response to having received the user input to switch the computing device from capturing the images using the camera to capturing images using the another camera of the computing device:
    (i) presenting, by the computing device, images captured using the another camera of the computing device on the user interface, and
    (ii) removing, by the computing device and from the user interface, the presented light source so that the user interface does not include the presented light source while the images captured using the another camera of the computing device are presented on the user interface.

9. The computer-implemented method of claim 1, further comprising:
  determining, by the computing device, that the computing device was disconnected from an external power source, or that a battery of the computing device dropped below a threshold power level;
  changing, by the computing device, the intensity of the light source from a first intensity level to a second intensity level as a result of having determined that the computing device was disconnected from an external power source, or that a battery of the computing device dropped below a threshold power level, wherein the first intensity level is less than the second intensity level;
  changing, by the computing device, an intensity of another portion of the user interface from a third intensity level to a fourth intensity level as a result of having determined that the computing device was disconnected from the external power source, or that the battery of the computing device dropped below the threshold power level, wherein the third intensity level is greater than the fourth intensity level; and
  presenting, by the computing device, the light source on the user interface with the second intensity level, as a result of having changed the intensity of the light source from the first intensity level to the second intensity level.

10. A computing system, comprising:
one or more processors; and
one or more non-transitory computer-readable devices including instructions that, when executed by the one or more processors, cause performance of operations including:
  receiving, by a computing device, a first image that was captured by a camera of the computing device;
  determining, by the computing device, a brightness of at least part of the first image that was captured by the camera of the computing device;
  selecting, by the computing device, a first intensity of a light source based on the determined brightness of the at least part of the first image that was captured by the camera of the computing device;

displaying, by the display of the computing device and in response to having received the first image and having determined the brightness of the at least part of the first image, a first presentation of a user interface that includes:
  (i) the light source, wherein the light source is presented with the selected first intensity that is based on the determined brightness of the at least part of the first image that was captured by the camera of the computing device, wherein the light source occupies a first portion of the user interface and does not occupy all of the user interface,
  (ii) a first video stream of images that were captured by a camera of a second computing device, wherein the first video stream of images occupies a second portion of the user interface that is different than the first portion of the user interface, and
  (iii) a second video stream of images that presents the first image that was captured by the camera of the computing device, wherein the second video stream of images occupies a third portion of the user interface that is different than the first and second portions of the user interface;

receiving, by the computing device, a second image that is captured by the camera of the computing device while the computing device is displaying the first presentation of the user interface that includes the presentation of the light source using the selected first intensity;

determining, by the computing device, a brightness of at least part of the second image that is captured by the camera of the computing device while the computing device is displaying the first presentation of the user interface;

selecting, by the computing device, a second intensity of the light source based on the determined brightness of the at least part of the second image that is captured by the camera of the computing device; and displaying, by the display of the computing device and in response to having received the second image and having determined the brightness of the at least part of the second image, a second presentation of the user interface that includes:
  (i) the light source, wherein the light source is presented with the selected second intensity that is based on the determined brightness of the at least part of the second image that is captured by the camera of the computing device, such that the light source in the second presentation of the user interface increases in brightness with respect to the presentation of the light source in the first presentation of the user interface,
  (ii) the first video stream of images that were captured by the camera of the second computing device, wherein the first video stream of images remains at a same brightness level or at a reduced brightness level with respect to brightness of the first video stream of images in the first presentation of the user interface, and
  (iii) the second video stream of images that presents the second image that is captured by the camera of the computing device.

11. The computing system of claim 10, wherein the light source is presented at a first location on the user interface, wherein the operations further comprise:
  receiving, by the computing device, user input that moves the light source from the first location on the user interface to a second location on the user interface;
  presenting, by the computing device in response to having received the user input that moves the light source from the first location on the user interface to the second location on the user interface, the light source at the second location on the user interface.

12. The computing system of claim 10, wherein selecting the intensity of the light source includes selecting a size of the light source on the user interface.

13. The computing system of claim 10, wherein selecting the intensity of the light source includes selecting a brightness of the light source.

14. The computing system of claim 10, the operations further comprising identifying, by the computing device, a portion of the first image that represents a person;
  wherein determining the brightness of the at least part of the first image includes determining the brightness of the portion of the first image that represents the person.

15. The computing system of claim 10, the operations further comprising:
  determining, by the computing device, a color mix of user interface that is displayed by the display; and
  selecting, by the computing device, a color of the light source to compensate for the color mix of the user interface, in order to affect a color of an illumination that is generated by the display,
  wherein the light source has the color that was selected to compensate for the color mix of the user interface.

16. The computing system of claim 10, the operations further comprising:
  transmitting, by the computing device, at least one of the images captured by the camera of the computing device, for display on the second computing device; and
  receiving, by the computing device, the first video stream of images from the second computing device, wherein the received first video stream of images is presented on the user interface concurrent with the light source.

17. The computing system of claim 10, the operations further comprising:
  receiving, by the computing device, user input to switch the computing device from capturing images using the camera to capturing images using another camera of the computing device; and
  in response to having received the user input to switch the computing device from capturing the images using the camera to capturing images using the another camera of the computing device:
    (i) presenting, by the computing device, images captured using the another camera of the computing device on the user interface, and
    (ii) removing, by the computing device and from the user interface, the presented light source so that the user interface does not include the presented light source while the images captured using the another camera of the computing device are presented on the user interface.

18. The computing system of claim 10, the operations further comprising:
  determining, by the computing device, that the computing device was disconnected from an external power source, or that a battery of the computing device dropped below a threshold power level;

changing, by the computing device, the intensity of the light source from a first intensity level to a second intensity level as a result of having determined that the computing device was disconnected from an external power source, or that a battery of the computing device dropped below a threshold power level, wherein the first intensity level is less than the second intensity level;

changing, by the computing device, an intensity of another portion of the user interface from a third intensity level to a fourth intensity level as a result of having determined that the computing device was disconnected from the external power source, or that the battery of the computing device dropped below the threshold power level, wherein the third intensity level is greater than the fourth intensity level; and presenting, by the computing device, the light source on the user interface with the second intensity level, as a result of having changed the intensity of the light source from the first intensity level to the second intensity level.

19. The computer-implemented method of claim 1, wherein the light source that occupies the first portion of the user interface is presented alongside the first video stream of images that occupies the second portion of the user interface.

20. The computer-implemented method of claim 1, wherein the light source that occupies the first portion of the user interface is presented within the first video stream of images that occupies the second portion of the user interface.

21. The computer-implemented method of claim 1, wherein the light source that occupies the first portion of the user interface has a circle shape.

22. The computer-implemented method of claim 1, wherein the light source is presented at a first location on the user interface, wherein the method further comprises:

determining, by the computing device, that a change to the user interface that includes the first video stream of images that occupies the second portion of the user interface would cause the light source that occupies the first portion of the user interface to obscure a particular portion of the user interface; and in response to the determining, automatically moving, by the computing device, the light source from the first location on the user interface to a second location on the user interface that is different than the first location, such that the light source does not obscure the particular portion of the user interface.

23. The computer-implemented method of claim 1, wherein the first video stream of images in the second presentation of the user interface remains at a same brightness level with respect to brightness of the first video stream of images in the first presentation of the user interface.

24. The computer-implemented method of claim 1, wherein the first video stream of images in the second presentation of the user interface has a reduced brightness level with respect to brightness of the first video stream of images in the first presentation of the user interface.

* * * * *